US012535935B2

(12) United States Patent
Amice et al.

(10) Patent No.: US 12,535,935 B2
(45) Date of Patent: Jan. 27, 2026

(54) SYSTEMS AND METHODS FOR ANNOTATION PANELS

(71) Applicant: GE Precision Healthcare LLC, Waukesha, WI (US)

(72) Inventors: Romane Amice, Buc (FR); Adeline Digard Bahuon, Buc (FR)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 271 days.

(21) Appl. No.: 18/339,160

(22) Filed: Jun. 21, 2023

(65) Prior Publication Data

US 2024/0427474 A1    Dec. 26, 2024

(51) Int. Cl.
*G06F 3/048* (2013.01)
*G06F 3/0482* (2013.01)
*G06F 40/169* (2020.01)
*G06T 11/00* (2006.01)
G16H 30/20 (2018.01)
G16H 30/40 (2018.01)

(52) U.S. Cl.
CPC .......... *G06F 3/0482* (2013.01); *G06F 40/169* (2020.01); *G06T 11/00* (2013.01); *G06T 2200/24* (2013.01); *G06T 2210/41* (2013.01); G16H 30/20 (2018.01); G16H 30/40 (2018.01)

(58) Field of Classification Search
CPC ...... G06F 3/0482; G06F 40/169; G06T 11/00; G06T 2200/24; G06T 2210/41; G06T 7/0012; G16H 30/20; G16H 30/40; A61B 3/0058
See application file for complete search history.

(56) References Cited

U.S. PATENT DOCUMENTS

| 6,230,169 | B1 * | 5/2001 | Nagae | G06F 40/169 |
| | | | | 715/233 |
| 7,432,938 | B1 * | 10/2008 | Reuter | G06F 40/134 |
| | | | | 345/672 |
| 9,769,008 | B1 * | 9/2017 | Petts | G06F 40/169 |
| 10,042,832 | B1 * | 8/2018 | Vagell | G06F 40/103 |

(Continued)

OTHER PUBLICATIONS

EP application 24179509.5 filed Jun. 3J, 2024—extended Search Report issued Nov. 20, 2024; 11 pages.

(Continued)

*Primary Examiner* — Patrick F Riegler
(74) *Attorney, Agent, or Firm* — McCoy Russell LLP

(57) ABSTRACT

Methods and systems are provided herein for displaying annotation panels in a medical imaging graphical user interface (GUI). In one example, a computing device comprising a display screen, the computing device being configured to display on the display screen a plurality of viewports within a GUI, each of the plurality of viewports displaying a respective medical image of a patient, and additionally being configured to display within the GUI one or more annotation icons and one or more annotation panels, the one or more annotation panels accessible directly from the one or more annotation icons and configured to display annotation data as a list of one or more annotations, wherein the each of the one or more annotation panels corresponds to a respective viewport of the GUI, and wherein the one or more annotation icons are displayed with the annotation data in an unlaunched state.

19 Claims, 10 Drawing Sheets

(56) References Cited

U.S. PATENT DOCUMENTS

| | | | |
|---|---|---|---|
| D926,798 S | 8/2021 | Gualtieri et al. | |
| 11,189,375 B1* | 11/2021 | O'Connor | G16H 30/40 |
| 2006/0143558 A1* | 6/2006 | Albornoz | G06F 3/0483 |
| | | | 715/205 |
| 2007/0055926 A1* | 3/2007 | Christiansen | G06Q 10/10 |
| | | | 715/244 |
| 2007/0242069 A1* | 10/2007 | Matsue | G16H 30/40 |
| | | | 345/428 |
| 2010/0135562 A1* | 6/2010 | Greenberg | G16H 30/20 |
| | | | 382/254 |
| 2011/0238618 A1* | 9/2011 | Valdiserri | G16H 30/40 |
| | | | 707/E17.019 |
| 2011/0289404 A1* | 11/2011 | Fleur | G06F 40/169 |
| | | | 715/255 |
| 2013/0124965 A1* | 5/2013 | Elias | G06F 16/9024 |
| | | | 715/230 |
| 2014/0047308 A1* | 2/2014 | Chub | G06F 40/171 |
| | | | 715/201 |
| 2014/0292814 A1* | 10/2014 | Tsujimoto | G06T 11/60 |
| | | | 345/636 |
| 2015/0005630 A1* | 1/2015 | Jung | A61B 8/465 |
| | | | 600/437 |
| 2016/0277328 A1* | 9/2016 | Ishizuka | H04L 51/226 |
| 2016/0350484 A1* | 12/2016 | Son | G16H 70/60 |
| 2019/0076125 A1* | 3/2019 | Roger | G16H 30/40 |
| 2019/0370319 A1* | 12/2019 | Suman | G06F 40/169 |
| 2019/0392031 A1* | 12/2019 | Akagi | G06T 11/60 |
| 2020/0402541 A1* | 12/2020 | Talbot | G11B 27/036 |
| 2022/0138482 A1* | 5/2022 | Ackermann | G06F 3/0484 |
| | | | 715/753 |
| 2022/0336071 A1* | 10/2022 | Laugerette | G16H 30/20 |
| 2023/0031089 A1* | 2/2023 | Fitzgerald | G06F 17/40 |
| 2023/0215010 A1* | 7/2023 | Soma | G06T 11/40 |
| 2023/0225681 A1* | 7/2023 | Ichinose | G16H 50/20 |
| | | | 382/128 |
| 2023/0281810 A1* | 9/2023 | Ichinose | G06F 1/1601 |
| 2023/0300182 A1* | 9/2023 | Milne | H04L 12/1822 |
| | | | 709/204 |
| 2023/0401708 A1* | 12/2023 | Takahashi | G06F 3/0481 |
| 2024/0127929 A1* | 4/2024 | Innanje | G16H 30/20 |
| 2025/0106479 A1* | 3/2025 | Zhou | G06F 16/33 |
| 2025/0111930 A1* | 4/2025 | Gérard | G16H 30/40 |

OTHER PUBLICATIONS

Ho B KT et al: "PACS workstation design", Computerized Medical Imaging and Graphics, Pergamon Press, New York, NY, US, vol. 15, No. 3, May 31, 1991 (May 31, 1991), pp. 147-155, XP022915729, ISSN: 0895-6111, DOI: 10.1016/0895-6111(91)90003-E [retrieved on May 1, 1991].

* cited by examiner

SYSTEMS AND METHODS FOR ANNOTATION PANELS

FIELD

Embodiments of the subject matter disclosed herein relate to medical imaging displays, and more specifically to annotation panels in graphical user interface viewports.

BACKGROUND

Medical images, often stored and transmitted as digital files in Digital Imaging and Communications in Medicine (DICOM) format, are displayed via display devices, often in graphical user interfaces of workstations or picture archiving and communication systems (PACS). Medical images, such as images of internal anatomy of a human subject (e.g., patient) acquired by computerized tomography (CT), magnetic resonance imaging (MRI), ultrasound, and the like, are used for diagnosis, monitoring, screening, and more by physicians and other care providers in medical settings. Physicians and other care providers use data of the medical images, including series number, patient orientation data, etc., often displayed as annotation overlays within the graphical user interface, to aid in evaluation and diagnosis.

BRIEF DESCRIPTION

In one example, systems and methods are provided herein for a computing device comprising a display screen, the computing device being configured to display on the display screen a plurality of viewports within a graphical user interface (GUI), each of the plurality of viewports displaying a respective medical image of a patient, and additionally being configured to display within the GUI one or more annotation icons and one or more annotation panels, the one or more annotation panels accessible directly from the one or more annotation icons and configured to display annotation data as a list of one or more annotations, wherein the each of the one or more annotation panels corresponds to a respective viewport of the GUI, and wherein the one or more annotation icons are displayed with the annotation data in an unlaunched state.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
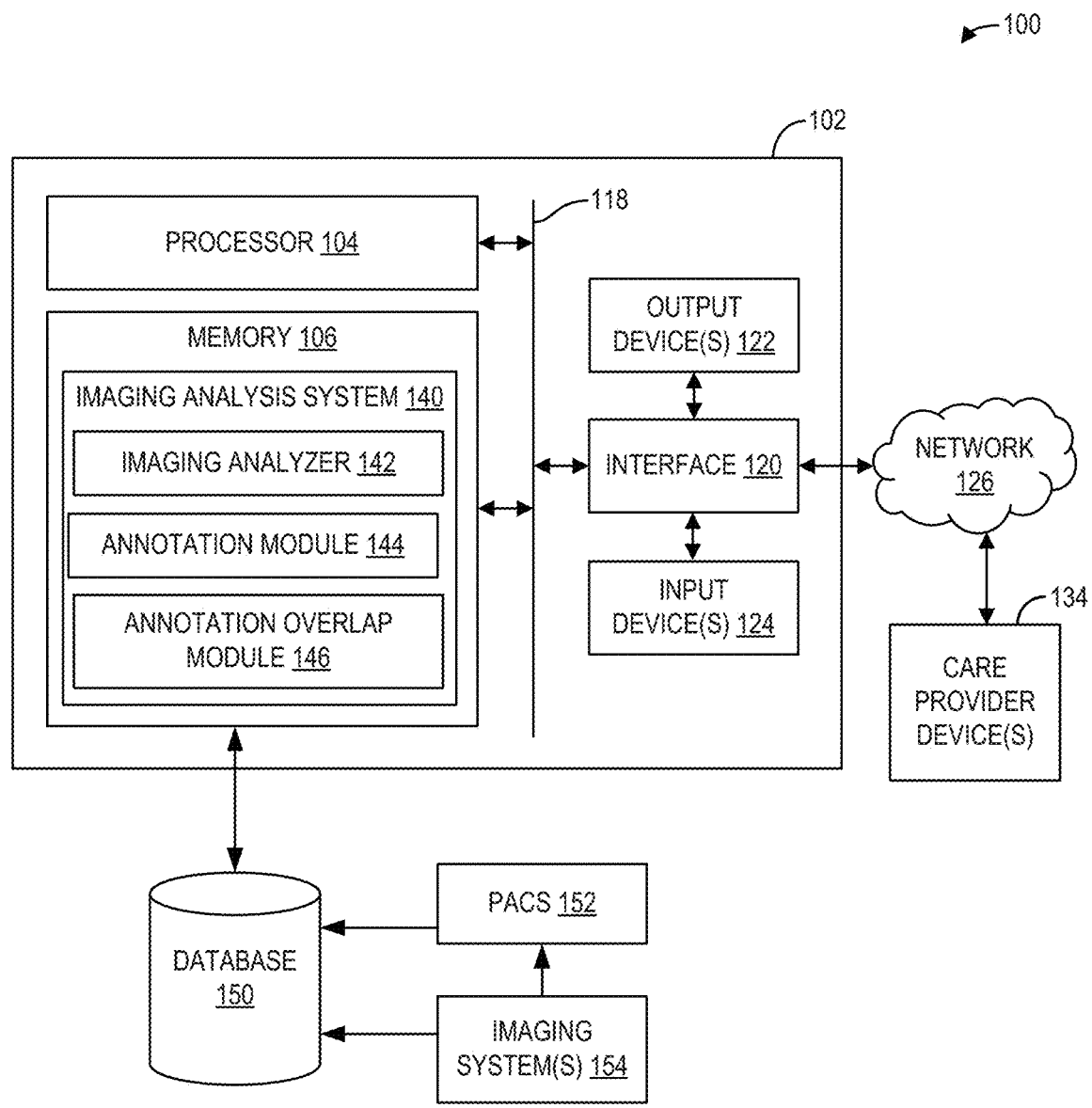
FIG. 1 shows a block diagram of an example computing system.

The following description relates to various embodiments for annotation panels in medical imaging displays. In particular, systems and methods for generating and displaying annotation panels in graphical user interfaces (GUIs) displaying one or more medical images are provided. One or more annotation panels may be displayed within a GUI in response to detection of one or more annotation overlaps occurring between annotation areas and/or annotation overlays displayed within the GUI.

Hospitals and other clinical facilities may provide computing systems with graphical user interfaces (GUIs) for displaying patient medical images to care providers and other users. Medical images may be displayed on display devices (e.g., screens) of care provider devices in a suitable format such as Digital Imaging and Communications in Medicine (DICOM). Medical images that are displayed in GUIs are constrained by dimensions of the display device, a window of the display device, and/or a viewport of the window of the display device in which they are displayed. Annotations are often overlaid on top of a corresponding image, wherein the annotations providing additional information to the care provider such as acquisition date, image series, orientation information, and the like. In some examples, such as with workstations used to display medical images, multiple viewports may be displayed within a single GUI window, each viewport displaying a different image. In such examples, and in other examples, viewports for images may be small and thus present challenges for displaying annotation overlays in predefined annotation areas. Small viewports or GUI windows may result in overlaps between annotation overlays and annotation areas that presents difficulties for visualizing the information in the annotation overlays, as overlaps may cause text within annotation overlays to be obscured, missing, or otherwise degraded.

Current methods for addressing overlapping annotations resulting for small viewports or windows include shrinking font size of the annotations, displaying simplified or brief versions of annotations, and condensing annotations for multiple images into a single overlay area. Each of these approaches presents its own challenges. For example, shrinking font size of the annotations may result in the annotations being unreadable by the care provider, and displaying simplified, brief, or otherwise condensed versions of the annotations may result in missing information that may be needed by the care provider during evaluation of one or more images for proper evaluation and/or diagnosis. In each case, without all relevant annotation information present and viewable by the care provider, evaluation of the medical images may be slower and/or less accurate.

The methods and systems provided herein detail annotation panels that may be displayed alongside viewports of a GUI when annotation overlaps are detected. The annotation panels herein described may be displayed in response to user selection of an annotation icon, wherein the annotation icon is displayed within a viewport in which at least one annotation overlap is detected. Detection of overlaps and display of annotation icons may be updated automatically dynamically in response to changes in viewport size. A position of the annotation panel may be selectively moved via user inputs to suit a user's desires. In this way, annotations that may otherwise be degraded by overlaps may be viewed in their entirety, thereby allowing for the user to utilize information (e.g., annotation data) presented as annotations in evaluation of images displayed in the GUI.

Referring now to FIG. 1, an example of a computing system 100 is shown. Computing system 100 comprises a computing device 102 which may comprise, as illustrative and non-limiting examples, a server, a personal computer, a workstation, a mobile device (e.g., a cellular phone, a smart phone, a computing tablet, and so on), or any other type of computing device.

The computing device 102 includes a processor 104 which may be configured to execute machine-readable instructions stored in memory 106. Processor 104 may be single core or multi-core, and the programs executed thereon may be configured for parallel or distributed processing. In some embodiments, the processor 104 may optionally include individual hardware components that are distributed throughout two or more devices, which may be remotely located and/or configured for coordinate processing. In some embodiments, one or more aspects of the processor 104 may be virtualized and executed by remotely-accessible networked computing devices configured in a cloud computing configuration.

As noted, the computing device 102 further includes memory 106. Memory 106 may include non-transitory memory, volatile memory, mass storage, local memory, the like, or some combination thereof. In some examples, memory 106 may include components disposed at two or more devices, which may be remotely located and/or configured for coordinate processing. In some embodiments, one or more aspects of the memory 106 may include remotely-accessible networked storage devices configured in a cloud computing configuration. The processor 104 and the memory 106 may be coupled, for example, via a communications bus 118.

The computing device 102 may further include an interface 120 communicatively coupled to the processor 104 and the memory 106 via the communications bus 118. The interface 120 may be implemented by one or more of any type of interface standard, such as an Ethernet interface, a universal serial bus (USB), a BLUETOOTH interface, a near field communication (NFC), and/or a PCI express interface.

The computing device 102 may further include one or more output device(s) 122 communicatively coupled to the processor 104 and the memory 106 via the interface 120. The output device(s) 122 may comprise, for example, one or more display devices. Such a display device may include one or more display devices utilizing virtually any type of technology (e.g., a light emitting diode (LED), an organic light emitting diode (OLED), a liquid crystal display (LCD), a cathode ray tube (CRT) display, an in-place switching (IPS) display, a touchscreen, and so on). In some examples, output device 122 may comprise a computer monitor configured to display medical information of various types and styles, including medical images. Output device(s) 122 may be combined with processor 104, memory 106, and/or user input device(s) 124 in a shared enclosure, or may be a peripheral display device and may comprise a monitor, touchscreen, projector, or other output device known in the art, which may enable a user to view decision support output (e.g., alerts) according to one or more examples of the current disclosure, and/or interact with various data stored in memory 106.

The computing device 102 may further include one or more user input device(s) 124 coupled to the processor 104 and the memory 106 via the interface 120. A user input device 124 may comprise, for example, one or more of a touchscreen, a keyboard, a mouse, a trackpad, a motion sensing camera, a microphone, or other device configured to enable a user to interact with and manipulate data within computing device 102.

The interface 120 may further include a communication device such as a transmitter, a receiver, a transceiver, a modem, a residential gateway, a wireless access point, and/or a network interface to facilitate exchange of data with external machines (e.g., computing devices of any kind) via a network 126. For example, the communication may be via, for example, an Ethernet connection, a digital subscriber line (DSL) connection, a telephone line connection, a coaxial cable system, a satellite system, a line-of-site wireless system, a cellulite telephone system, and so on. As a non-limiting example, FIG. 1 shows one or more care provider devices 134 that may be communicatively coupled to computing device 102. Each care provider device may include a processor, memory, communication module, user input device, display (e.g., screen or monitor), and/or other subsystems (similar to the process, memory, communication module, user input device, and output device of computing device 102) and may be in the form of a desktop computing device, a laptop computing device, a tablet, a smart phone, or other device. Each care provider device may be adapted to send and receive encrypted data and display medical information, including medical images, in a suitable format such as DICOM or other standards. As will be explained in greater detail below, the care provider devices may display GUIs described herein (including annotation overlays and annotation panels) on respective display screens.

An imaging analysis system 140 may obtain, analyze, and display medical images of one or more patients based on instructions stored in memory 106. The imaging analysis system 140 may comprise an imaging analyzer 142, an annotation module 144, and an annotation overlap module 146. The imaging analysis system 140 may be communicatively coupled to a database 150. The database 150 may store medical information, including medical images and data thereof, obtained from a picture archiving and communications system (PACS) 152 and/or imaging system(s) 154. The imaging system(s) 154, such as computerized tomography (CT) systems, magnetic resonance imaging (MRI) systems, positron emission tomography (PET) systems, and the like, may comprise an imager configured to acquire medical imaging data and may be configured to reconstruct medical images from the medical imaging data. The medical images may be stored via the PACS 152 or stored directly via the database 150.

The imaging analyzer 142 may analyze obtained medical imaging data and determine one or more parameters of corresponding medical images. In some examples, the imaging analyzer 142 may organize medical images by patient, date, type of scan, and the like. The imaging analyzer 142 may obtain, generate, or otherwise determine dates of images, image series, patient orientation for images, and more. The imaging analyzer 142 may also include instructions for generating one or more reformations and/or renderings from the obtained medical images, such as multiplanar reformations (MPRs), maximum intensity projections (MIPs), and the like. Resulting reformations and/or renderings may be displayed in a GUI via the care provider device(s) 134.

The annotation module 144 may obtain annotation data, such as image series, image date, image orientation, and the like, as determined by the imaging analyzer 142. The annotation module 144 may further generate and display annotation overlays within a viewport of the GUI, wherein each viewport corresponds to a displayed image. Each annotation may be overlaid in a viewport in a designated annotation area. Multiple annotation areas may be predefined for each viewport. The annotation overlays and the annotation areas may have a defined size (e.g., defined number of pixels of which it occupies) and position. For example, one or more of the annotation areas may be positioned towards a left side of a viewport. Height of an annotation area may be, in some examples, 22 pixels, and a width of each annotation area may be defined by the annotation being overlaid therewithin (e.g., based on number of characters of text of the annotation, the text being of a predetermined font).

In some examples, pixels of the viewport that the annotation areas occupy may change based on a size of a viewport. For example, if a window, and consequently a viewport, is shrunk from a first size to a second, smaller size that includes a smaller number of pixels, the annotation areas may not decrease in size and therefore the position of the annotation areas, and consequently the pixels of which they occupy, may change. In certain examples as herein described, a viewport size may result in overlapping annotation areas, which in turn results in one annotation overlay within a first annotation area being displayed on top of a portion of another annotation overlay within a second annotation area.

The annotation overlap module 146 may determine presence of one or more annotation overlaps within each of a plurality of viewports of the GUI. For example, two or more annotation areas may be overlapping if at least a portion of each occupy the same pixels within the viewport. Often, annotation overlaps may result in degraded information presentation as not all annotation information is visible due to the overlap. Further, the annotation overlap module 146 may condense a subset of annotation data displayed as overlays within a viewport, whereby the subset of annotation data is accessible via user selection of an annotation icon that is displayed in response to detection of at least one annotation overlap within the viewport. Condensing the subset of annotation data, in this context, includes removing a corresponding subset of annotation overlays from the viewport, the data of those annotations being stored in memory and accessible and displayable via user selection of the annotation icon. The annotation icon may only be displayed within the viewport when an annotation overlap is detected. The annotation overlap module 146 may determine which annotation areas are overlapping and which annotation areas are included in the portion that is condensed. In some examples, each annotation except orientation annotation information is removed from the viewport to be accessed via the annotation icon. In other examples, each annotation except date, series, and orientation is removed from the viewport, as will be described with respect to FIGS. 3 and 4.

Figure 2:
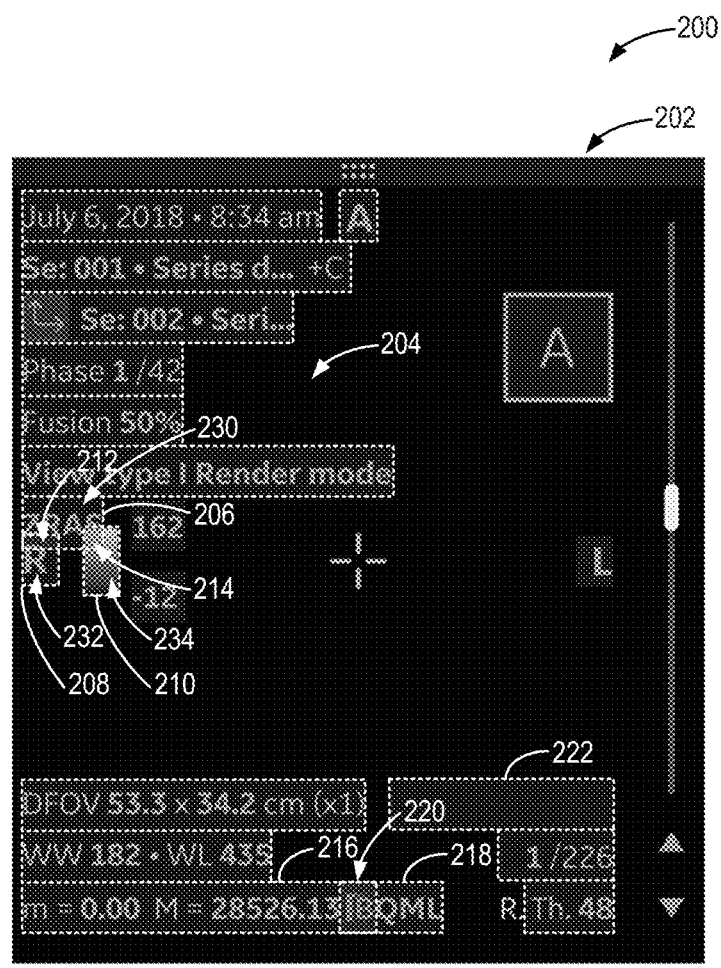
FIG. 2 shows an example annotation overlay of a viewport.

Turning now to FIG. 2, an example first viewport 202 of a GUI 200 is shown. The first viewport 202 may be one of a plurality of viewports displayed within the GUI 200. In some examples, the first viewport 202 may display an image (e.g., a single slice of an image, a reformation image (e.g., an MPR), or a rendered image (e.g., a MIP)). The first viewport 202 may be displayed in part via an image analysis system, such as imaging analysis system 140 of the computing system 100 of FIG. 1.

The first viewport 202, as shown, includes a plurality of annotation areas 204. An annotation overlay may be displayed within a respective annotation area of the plurality of annotation areas 204. For example, first annotation area 206 displays a first annotation overlay 230 detailing information of image orientation type. Second annotation area 208 may display an second annotation overlay 232 comprising an orientation label designating laterality of an image displayed within the first viewport 202 and third annotation area 210 may display a third annotation overlay 234 comprising an intensity gradient for the image (e.g., a visual representation of the image's window width). Other annotation overlays displayed within the plurality of annotation areas 204 may detail information such as date of image acquisition, image series, image phase, image fusion percentage, view type, among others.

Each of the plurality of annotation areas 204 may have a predefined height and width corresponding to a predefined number of pixels in which it occupies. In some examples, the height of each of the plurality of annotation areas 204 may be equal to each other, such as a height of 22 pixels, while the width of each of the plurality of annotation areas 204 may be specific to the annotation overlaid therewithin. The width of each of the plurality of annotation areas 204 may be defined by the number of characters of the annotation. For example, annotation areas that display annotations with more characters may be wider and therefore may occupy more pixels in a widthwise direction than annotation areas that display annotations with less characters. In some examples, the number of pixels that an annotation area occupies may be defined for the annotation area and may not be altered. For example, the number of pixels that an annotation area occupies may not depend on a size of the first viewport 202. As such, when the size of the first viewport 202 is changed, more or less annotation overlaps may occur therein.

The plurality of annotation areas 204 and therefore their corresponding annotation overlays may, in some instances, overlap such that at least a portion of at least two annotation areas occupy the same pixels within the first viewport 202 (e.g., pixels of two or more annotation areas occupy the same space). In such examples, the overlap of annotation overlays may result in degradation of the annotation when visualized, for example text may be cut off, blurred, overlaid on top of another annotation overlay, or otherwise changed because of the overlap and/or viewport dimension constraints. In other examples, annotation areas may not overlap and each annotation of an overlay displayed within an annotation area may be entirely visible to a user. As explained above, overlaps in annotation areas and/or annotation overlays may result from size/dimensions of the first viewport 202, the GUI 200, or a display device on which the GUI 200 and the first viewport 202 (as well as other viewports of the GUI 200) are displayed.

More than one overlap may be present and detected within a viewport, and an annotation area may overlap with more than one other annotation area. For example, a first annotation overlap 212 may be present between the first annotation area 206 and the second annotation area 208. Further, a second annotation overlap 214 may occur between the first annotation area 206 and the third annotation area

210. In this way, one or more pixels of the first annotation area 206 and thus the first annotation overlay 230 displayed therein, may overlap with one or more pixels of both the second and third annotation areas 208, 210. As another example, a fourth annotation area 216 and a fifth annotation area 218 may be in included in the first viewport 202. In some examples, such as for CT images, the annotation overlaid within the fourth annotation area 216 details dimensions of a field of view of an imaging system used to acquire the image displayed within the first viewport 202, a window width, which is a measure of a range of CT numbers (e.g., normalized values of calculated x-ray absorption coefficient of a pixel) that the image contains, a window level (e.g., a midpoint of the window width), and the like. The annotation overlaid within the fifth annotation area 218 may detail absolute activity concentration for a radiotracer or contrast used when acquiring the image. As shown, the fourth annotation area 216 and the fifth annotation area 218 overlap at a third annotation overlap 220. The third annotation overlap 220 may degrade or otherwise hinder visualization of the annotations overlaid within the fourth and fifth annotation areas 216, 218. In contrast, a sixth annotation area 222 may not overlap with another annotation area, such as fifth annotation area 218, and may therefore be not degraded and fully visible.

An amount of annotation overlaps as well as size of one or more annotation overlaps may depend on size or dimensions of the first viewport 202 in which the annotations are overlaid. In some examples, smaller viewports may result in more and/or larger annotation overlaps. Viewport size and/or dimension may depend on window size of the GUI as well as how many viewports are displayed within the GUI, wherein more viewports displayed results in smaller viewports and therefore more annotation overlaps. Detection of at least one annotation overlap within a viewport via an annotation overlap module of the imaging analysis system may trigger removal of at least some of the overlaid annotations therein, as will be further described.

Figure 3:
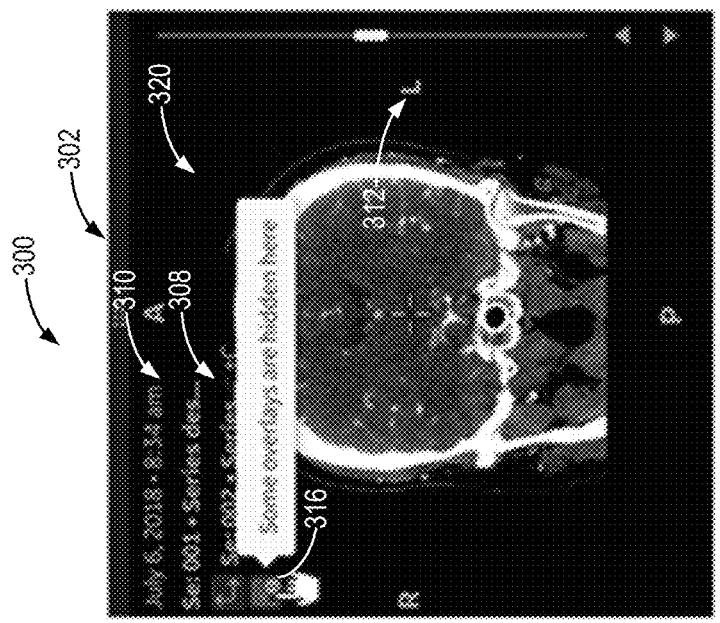
FIG. 3 shows a first example viewport of a graphical user interface (GUI) before and after condensing annotations.
Figure 3:
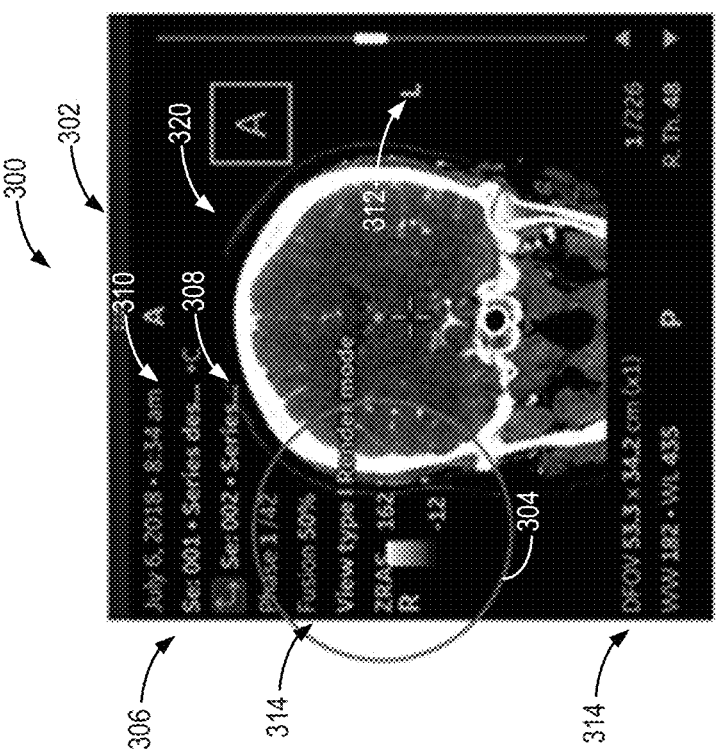

Turning now to FIG. 3, an example second viewport 302 displayed within a second GUI 300 is shown. The second viewport 302 may be one of a plurality of viewports displayed within the second GUI 300. In some examples, the second viewport 302 may display an image, a reformation image (e.g., an MPR), or a rendered image (e.g., a MIP). The second viewport 302 may be displayed in part via an image analysis system, such as imaging analysis system 140 of the computing system 100 of FIG. 1. In some examples, the plurality of viewports displayed within the second GUI 300 may be configured as a grid, where each of the viewports has uniform dimensions configured to fit within dimensions of the second GUI 300. Dimensions of the plurality of viewports may dynamically change in response to changes in dimensions of the GUI. The dimensions of the second GUI 300 may be constrained by a window size, a display screen size, and the like. In FIG. 3, the second viewport 302, as shown on the left of FIG. 3, may be displayed prior to condensation of annotations resulting from annotation overlap detection, and the second viewport 302, as shown on the right of FIG. 3, may be displayed following condensation of annotations resulting from annotation overlap detection.

An image 320 may be displayed within the second viewport 302. The image 320 may be a single image or image slice, an image reformation (e.g., an MPR), or a projected rendering (e.g., a MIP) as noted. The second viewport 302 may further comprise a plurality of annotation overlays 306. The plurality of annotation overlays 306 may be displayed in a plurality of predefined annotation areas within the second viewport 302. In some examples, annotation areas may occupy the same pixels of the second viewport 302, as is the case for an annotation overlap, as previously described. In such an example as is shown in FIG. 3, one or more annotation overlaps 304, shown within a circle, may be detected by an annotation overlap module of the image analysis system.

The plurality of annotation overlays 306 may comprise an image series annotation 308, a date annotation 310, one or more orientation annotations 312, and other additional annotations 314 such as image phase, image fusion percentage, and the like. In response to detection of at least one annotation overlap within the second viewport 302, at least a portion of the plurality of annotation overlays 306 may be condensed and an annotation icon 316 may be displayed. The annotation icon 316 may be a selectable element within the GUI that upon selection triggers launch of a separate pop-up panel, as will be further described below. Condensing annotation data, as previously described with respect to FIG. 1, includes removing the portion of the plurality of annotation overlays 306 from being displayed within the second viewport 302 while remaining accessible and displayable via user selection of the annotation icon 316. Depending on viewport size, size of the one or more annotation overlaps, and amount and position of the one or more annotation overlaps, which annotation overlays are condensed may differ. Detection of annotation overlaps may occur automatically in response to initial display and/or in response to a change in viewport size. In this way, display and condensation of annotation overlays within the viewport may be dynamic, allowing for real-time adjustments in viewport display.

In the post-detection example shown on the right in FIG. 3, the image series annotation 308, the date annotation 310, and the one or more orientation annotations 312 remain as displayed within respective annotation areas in the second viewport 302 while the other additional annotations 314 are removed from the second viewport 302. The other additional annotations 314 may be accessed via selection of the annotation icon 316. User input of a first type, such as via a left mouse click, of the annotation icon 316 may launch display of an annotation panel adjacent to the second viewport 302, the other additional annotations 314 may be displayed within the annotation panel, as will be further described. Further, in some examples, user input of a second type to the annotation icon 316, such as hovering over the annotation icon 316 or right clicking the annotation icon 316, may trigger display of a pop-up window that displays a limited list with brief or otherwise shortened information of the condensed annotations. This pop-up window as described may be a preview of the annotation panel that is launched upon user selection (e.g., via the first type of user input) of the annotation icon 316. In this way, the annotations may be previewed by the user prior to launching the annotation panel, thereby reducing processing power of the computing system and time spent in launching the annotation panel in cases in which the annotation panel need not be viewed.

Figure 4:
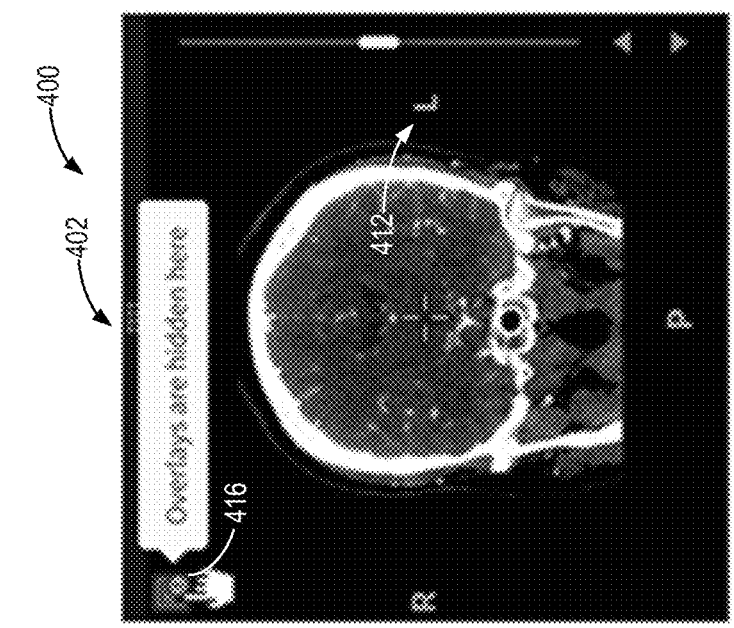
FIG. 4 shows a second example viewport of a GUI before and after condensing annotations.
Figure 4:
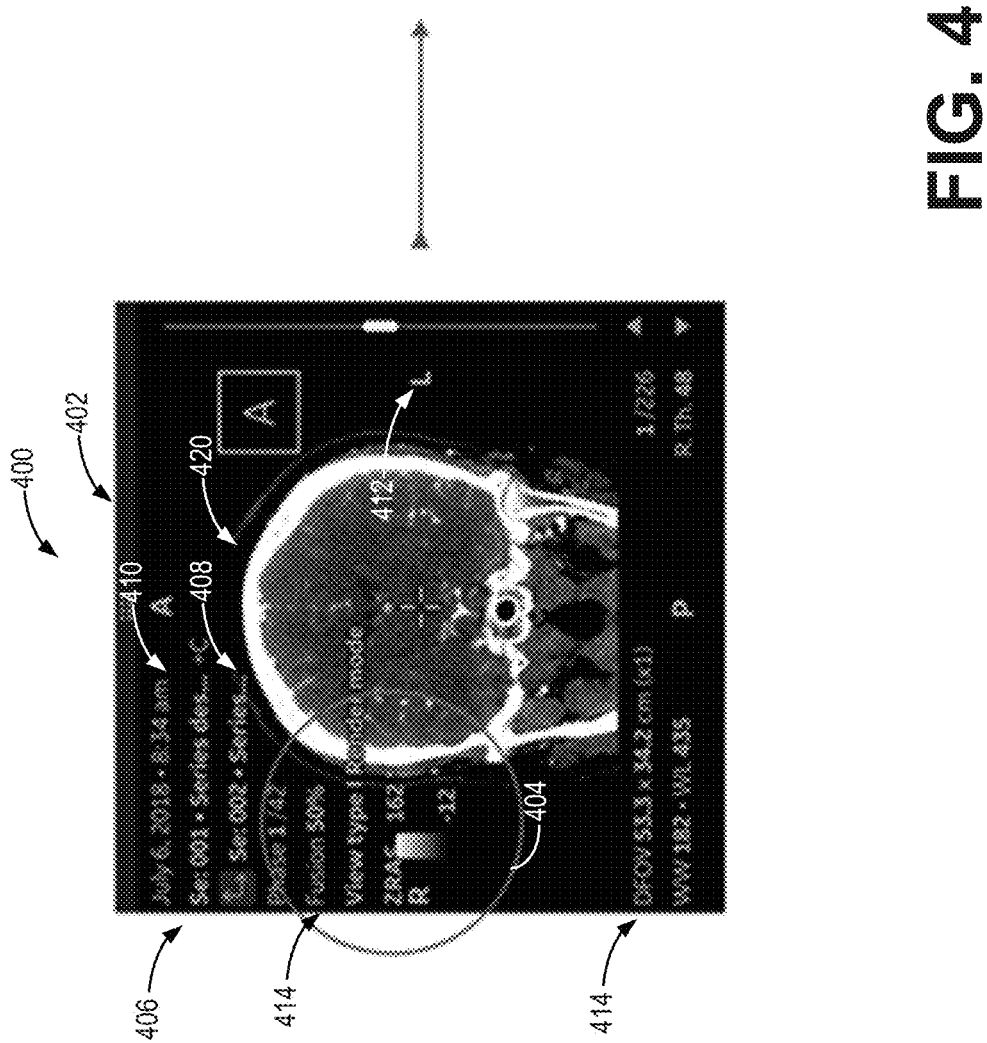

Referring now to FIG. 4, another example third viewport 402 displayed within a third GUI 400 is shown. In some examples, the third GUI 400 may be the same as second GUI 300. The third viewport 402 may be one of a plurality of viewports displayed within the third GUI 400. In some examples, the third viewport 402 may display an image (e.g., a single image slice, a reformation image (e.g., an MPR), or a rendered image (e.g., a MIP)). The third viewport 402 may be displayed in part via an image analysis system, such as imaging analysis system 140 of the computing system 100 of FIG. 1. In some examples, the plurality of viewports displayed within the third GUI 400 may be arranged as a grid, where each of the viewports has uniform dimensions configured to fit within dimensions of the third GUI 400. The dimensions of the third GUI 400 may be constrained by a window size, a display screen size, and the like.

Similar to the second viewport 302 of FIG. 3, the third viewport 402 may comprise an image 420 displayed therein. The image 420 may be a single image or image slice, an image reformation (e.g., an MPR), or a projected rendering (e.g., a MIP). The third viewport 402 may further comprise a plurality of annotation overlays 406. The plurality of annotation overlays 406 may each be displayed within a respective annotation area within the third viewport 402. In the example shown in FIG. 4, an annotation overlap 404 may be detected by an annotation overlap module of the image analysis system.

Similar to as described with respect to FIG. 3, the plurality of annotation overlays 406 may comprise an image series annotation 408, a date annotation 410, one or more orientation annotations 412, and other additional annotations 414. In response to detection of at least one annotation overlap within the third viewport 402, at least a portion of the plurality of annotation overlays 406 may be condensed and an annotation icon 416 may be displayed. Condensing relevant annotation data, as previously described with respect to FIG. 1, includes removing the portion of the plurality of annotation overlays 406 from being displayed within the third viewport 402 while remaining accessible and displayable via selection of the annotation icon 416.

As described previously, depending on viewport size, size of the one or more annotation overlaps, and amount and position of the one or more annotation overlaps, which annotation overlays are condensed may differ. While in FIG. 3, the date, series, and orientation annotation overlays remain displayed within the second viewport 302, in FIG. 4, only the one or more orientation annotations 412 remain displayed within the third viewport 402. The series annotation 408, the date annotation 410, and the other additional annotations 414 are condensed, removed from being displayed within the third viewport 402, and stored as accessible via user selection of the annotation icon 416. In response to user selection of the annotation icon 416, an annotation panel may be displayed adjacent to the third viewport 402, wherein each of the annotations of the plurality of annotation overlays 406 may be displayed within the annotation panel. Further, in some examples, as described with respect to FIG. 3, hovering over or right clicking the annotation icon 416 may launch a pop-up window displaying a limited list with brief or otherwise shortened information of the condensed annotations.

In some examples, only the orientation annotations may remain displayed within a viewport, as is shown in FIG. 4, when one or more annotation overlaps are detected that include one of the series annotation and the date annotation. The series annotation and the date annotation may remain displayed within the viewport when both the series and the date annotations are not included in any annotation overlap.

Figure 5:
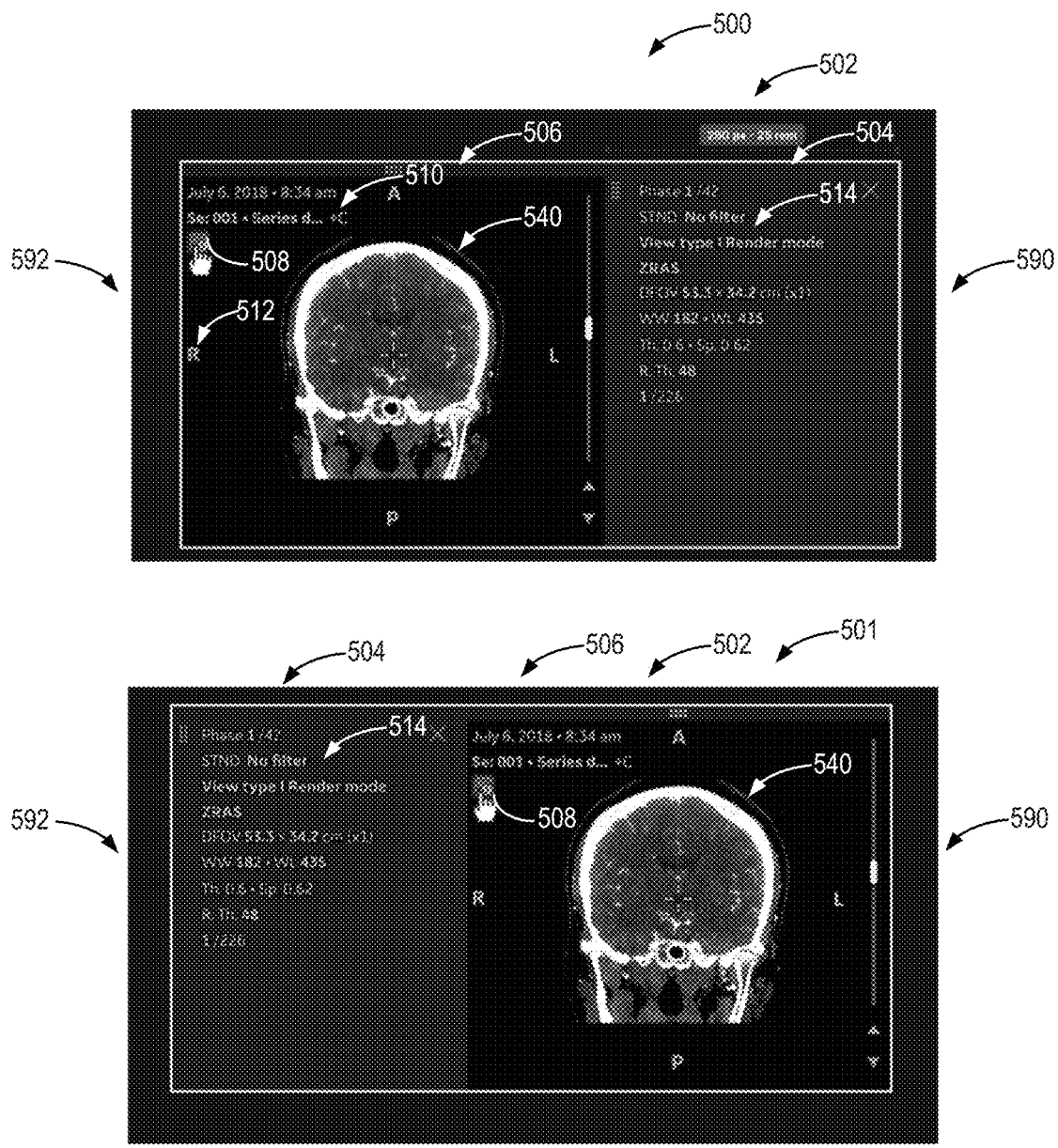
FIG. 5 shows a third and fourth example viewport with first and second annotation panels.

An example of an annotation panel as herein described is shown in FIG. 5. In a first example 500, a fourth viewport 506 is displayed within a fourth GUI 502. The fourth viewport 506, similar to the second viewport 302 and the third viewport 402, may display an image 540 (e.g., a single image or image slice, an MPR, a MIP, etc.). The fourth viewport 506 further comprises one or more annotation overlays 510 displayed therein detailing annotation data specific to the image 540. As described above, detection of one or more annotation overlaps between two or more annotation areas in which annotation overlays are displayed may trigger removal of a plurality of annotations of the one or more annotation overlays 510 from the fourth viewport 506 and display of an annotation icon 508 within the fourth viewport 506. The annotation icon 508 may be a selectable element that when selected via user input, triggers display of an annotation panel 504. The annotation panel 504 may display one or more annotations 514 therein, whereby the one or more annotations 514 are the one or more annotations removed from the fourth viewport 506 in response to detection of one or more annotation overlaps. One or more annotation overlays, such as an orientation annotation overlay 512, may still be displayed within the fourth viewport 506 upon launching display of the annotation panel 504. The annotation panel 504 may be linked to the fourth viewport 506 from which it was launched and the annotation panel 504 may thus be displayed adjacent to a border of the fourth viewport 506.

In some examples, a subset of the one or more annotations 514 displayed within the annotation panel 504 may be interactive. The subset of the one or more annotations 514 that are interactive may be annotations that when displayed as overlays within the fourth viewport 506 are also interactive. Interactive annotations may be selectable elements that when selected via user input (e.g., a mouse click, mouse hover, etc.) trigger launch of a pop-up window such as a drop down menu, as will be described in further detail with respect to FIG. 8.

In the first example 500, the annotation panel 504 is displayed bordering a first side 590 of the fourth viewport 506. In some examples, an annotation panel may be initially launched in a position bordering the first side 590 of a corresponding viewport when the corresponding viewport does not border the first side 590 of the GUI (e.g., is not in a lateral most position such that the first side border is accessible for display of the annotation panel). In examples in which the fourth viewport 506 borders the first side 590 of the fourth GUI 502, as in a second example 501 shown in FIG. 5, the annotation panel 504 may be initially launched in a position bordering a second side 592 of the fourth viewport 506. In this way, the initial position of the annotation panel 504 may be within the window of the fourth GUI 502 and may avoid being cut off by borders of the fourth GUI 502.

The annotation panel 504 may be displayed as an overlay within the fourth GUI 502 such that a neighboring viewport directly adjacent to (e.g., bordering) the fourth viewport 506 may be partly covered by the annotation panel 504. In some examples, a position of the annotation panel 504 may be adjustable via user inputs and therefore the neighboring viewport may be one of at least two adjacent viewports. In this way, the user may alter the position of the annotation panel 504 to their liking, in order to allow for ease of evaluation of the plurality of images displayed within the fourth GUI 502.

Figure 6:
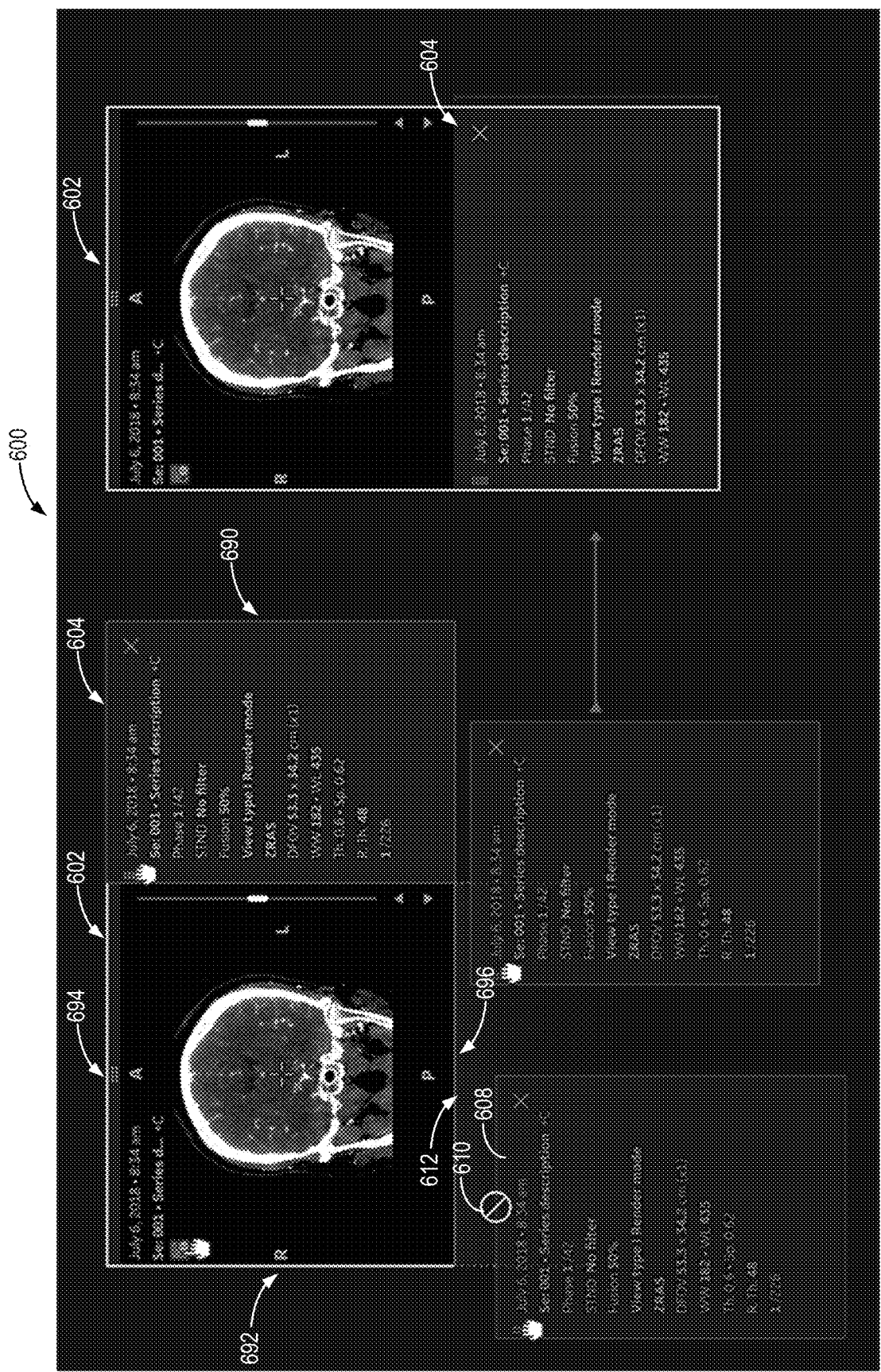
FIG. 6 shows an example GUI with an annotation panel in a variety of positions.

Turning now to FIG. 6, an example fifth viewport 602 of a fifth GUI 600 is shown. The fifth viewport 602 may be displayed in part via an image analysis system, such as imaging analysis system 140 of the computing system 100 of FIG. 1. An annotation panel 604 linked to the fifth viewport 602 is also shown, displayed bordering a first side 690 of the fifth viewport 602.

As described with respect to FIG. 5, a position of the annotation panel 604 may be manually adjustable via user input. An initial position of the annotation panel 604 may border the first side 690 or a second side 692 of the fifth viewport 602 depending on a position of the fifth viewport 602 within the fifth GUI 600. Available positions for the annotation panel 604 may at most include directly to the right (e.g., bordering a right side), directly to the left (e.g., bordering a left side), directly above (e.g., bordering a top edge), and directly below (e.g., bordering a bottom edge) the fifth viewport 602. Depending on a position of the fifth viewport 602, however, less positions for the annotation panel 604 may be available. For example, a top border of the fifth viewport 602 may not be available for the annotation panel 604 when the fifth viewport 602 borders a top edge 694 of the fifth GUI 600. Similarly, a bottom border of the fifth viewport 602 may not be available for the annotation panel 604 when the fifth viewport 602 borders a bottom edge 696 of the fifth GUI 600. In this way, the annotation panel 604 may be positioned directly adjacent to an inside border of the fifth viewport 602 so that the annotation panel 604 remains within the window of the fifth GUI 600 and is visibly linked to the corresponding fifth viewport 602.

In an example, the fifth viewport 602 may border the second side 692 and the top edge 694 of the fifth GUI 600, and as such, an available panel position 612 may border the bottom edge 696 of the fifth viewport 602 when the annotation panel 604 is initially displayed on the first side 690 of the fifth viewport 602. The annotation panel 604 may be selectable via a first user input, such as a mouse click or a mouse click and hold, to allow for manual adjustment of the position of the annotation panel 604, for example via a drag and drop process. A preview 608 of the annotation panel 604 may be displayed within the fifth GUI 600 during position adjustment of the annotation panel 604 to guide the user in positioning the annotation panel 604. A ban icon 610 may be displayed if the user attempts to move the annotation panel 604 to an unavailable position, for example outside of the window of the fifth GUI 600 (e.g., in the example presented, to the second side 692). Further, in some examples, if the user adjusts the position of the annotation panel 604 to adjacent to a different viewport of the fifth GUI 600, the annotation panel 604 may automatically be moved back to its previous or original position or to a closest available panel position linked to the corresponding fifth viewport 602. In this way, the annotation panel 604 may always be clearly linked to the corresponding viewport to avoid errors during evaluation.

Once the user positions the annotation panel 604 as desired, a second user input such as another mouse click or releasing a hold, my trigger display of the annotation panel 604 in the position selected. The annotation panel 604 may then be displayed in the desired position. For example, in FIG. 6, the annotation panel 604 is moved from to the right of the fifth viewport 602 to below the fifth viewport 602. Annotations displayed within the annotation panel 604 may remain the same when a position of the annotation panel 604 is altered, though a configuration of the annotations displayed therein may change, in some examples, as will be described below.

Figure 7:
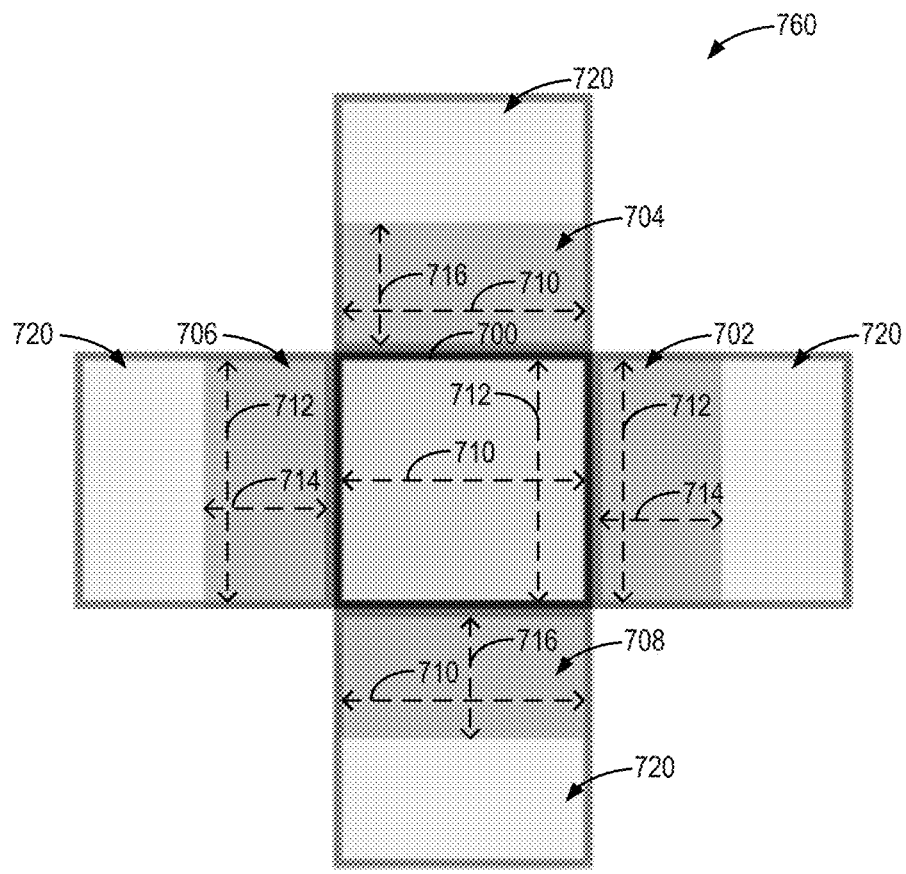
FIG. 7 shows a schematic depiction of available positions of an annotation panel.

Turning now to FIG. 7, a diagram 760 of an example viewport 700 is shown. The diagram 760 comprises the viewport 700 and all available annotation panel positions in examples in which the viewport 700 does not border any side or edge (e.g., top or bottom edge) of the GUI in which it is displayed. In other examples, as described above, less annotation panel positions may be available if the viewport 700 borders a side or edge of the GUI.

The available panel positions for the viewport 700 may comprise a first panel position 702 (e.g., a right position), a second panel position 704 (e.g., a top position), a third panel position 706 (e.g., a left position), and a fourth panel position 708 (e.g., a bottom position). The viewport 700 may have a first height 712 and a first width 710. The first and third panel positions 702, 706 may have the first height 712 and a second width 714, wherein the second width 714 is less than the first width 710. The second and fourth panel positions 704, 708 may have the first width 710 and a second height 716, wherein the second height 716 is less than the first height 712. In this way, each of available panel positions may have an area smaller than the viewport 700 and therefore, a neighboring viewport 720 that is directly adjacent to the viewport 700 in any direction (e.g., right, left, above, or below) may be partially covered by an annotation panel when the annotation panel is positioned in a corresponding available panel position.

Annotations displayed within an annotation panel may be configured for the dimensions of the annotation panel position. For example, annotations within an annotation panel in the first and/or third panel positions 702, 706 may be displayed as a list configured for the first height 712 and the second width 714, while annotations within an annotation panel in the second and/or fourth panel positions 704, 708 may be displayed as a list configured for the second height 716 and the first width 710. In this way, the annotations displayed within the panel may be dynamically updated as the position of the panel is changed. Configuration changes as herein referenced may include altering how many lines each annotation occupies (e.g., wrapping of text for narrower widths compared to wider widths).

Figure 8:
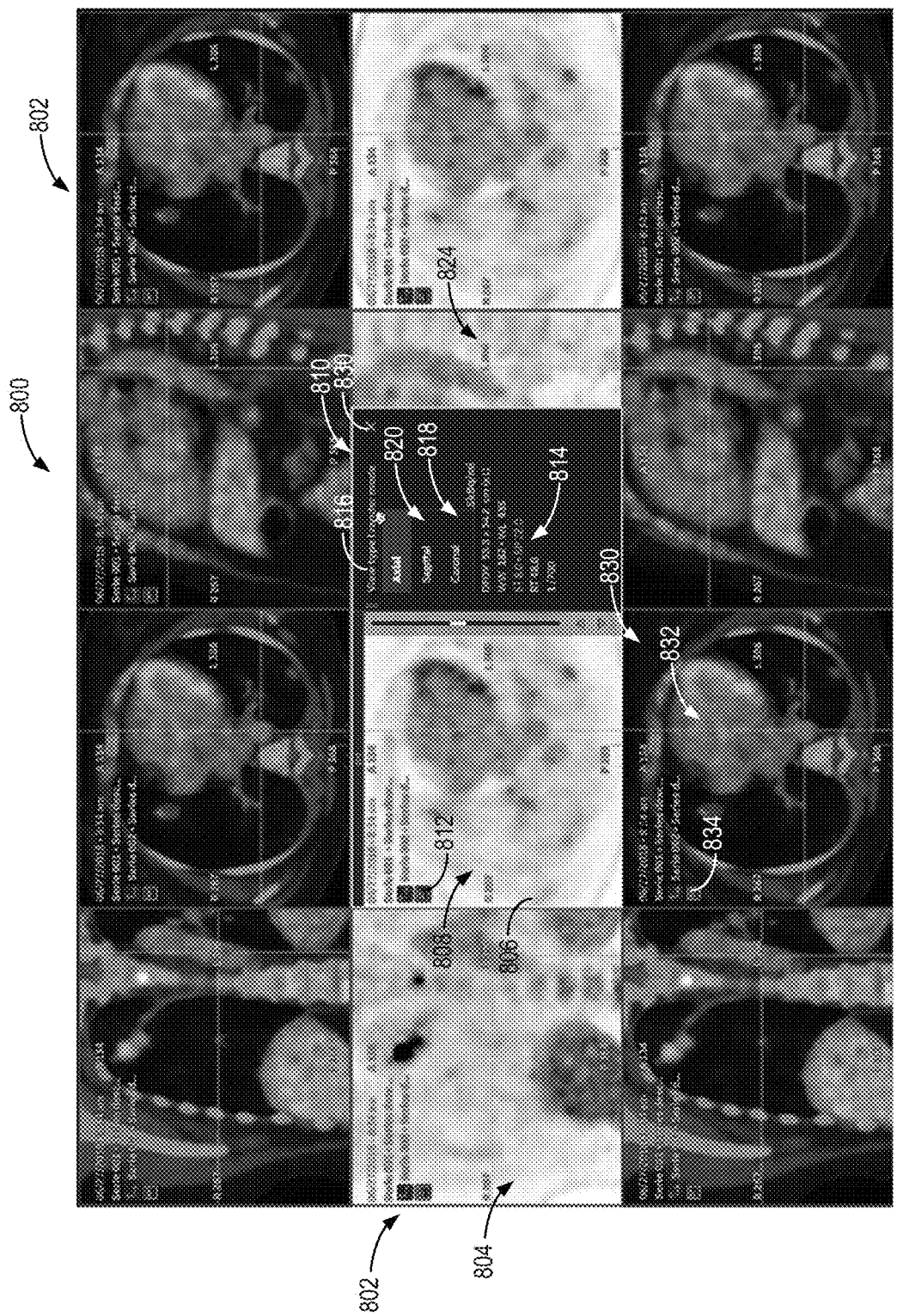
FIG. 8 shows another example GUI with a plurality of viewports.

Turning now to FIG. 8, an example GUI 800 displaying a plurality of viewports 802 is shown. The plurality of viewports 802 may be arranged as a grid of viewports within the GUI 800, wherein each of the plurality of viewports 802 borders at least two other viewports of the plurality of viewports 802. The plurality of viewports 802 may display a plurality of medical images 804, each of the plurality of viewports 802 displaying one of the plurality of medical images 804 and a plurality of annotation overlays detailing information of the displayed image. Each of the plurality of annotation overlays may be displayed within a designated annotation area of a corresponding viewport.

In some examples, one or more annotation overlaps may be detected within one or more of the plurality of viewports 802 and one or more of the annotation overlays of the corresponding viewports may be removed from display and an annotation icon may be displayed instead. For example, a first viewport 806 displaying a first image 808 may also display a first annotation icon 812. The first annotation icon 812 may be selectable via user input to launch an annotation panel 810. The annotation panel 810 may be a pop-up window that is linked to the first viewport 806 and is displayed bordering a side or edge the first viewport 806. A second viewport 830 displaying a second image 832 may also display a second annotation icon 834. The second annotation icon 834 may be selectable via user input to launch a second annotation panel (not shown). The second annotation panel may be a second pop-up window that is linked to the second viewport 830. In this way, each annotation icon may be selectable to launch a respective annotation panel corresponding to the viewport to which the annotation icon belongs.

The annotation panel 810 may display one or more annotations 814. The one or more annotations 814 may be of the annotation data condensed from the first viewport 806 in response to detection of one or more annotation overlaps. As described previously, in some examples, the one or more annotations overlays displayed within the viewport may be interactive annotations, whereby the annotations are selectable via a variety of user inputs (e.g., mouse click, hovering, etc.). Selection of one or the one or more annotation overlays may trigger launch of a menu, a limited list, or other separate window. The one or more annotations displayed within the annotation panel may retain their interactive nature and may be selectable in the same manner as when displayed within the viewport.

As an example, a first annotation 816 displayed within the annotation panel 810 linked to the first viewport 806 may be an interactive annotation. The first annotation 816 may detail a view type for the first image 808 displayed within the first viewport 806. Selection of the first annotation 816 via user input such as a mouse click may trigger display of a drop down menu 818 within a pop-up window. The drop down menu 818 may include a plurality of selectable elements 820 that when selected change the view type of the first image 808. For example, the drop down menu 818 may include view types axial, sagittal, and coronal. Other annotations, such as render mode, may be selectable in a similar fashion to launch a corresponding drop down menu, for example a drop down menu for a render mode annotation may include render modes such as MPR, volume rendering, MIP, and the like that when selected change the rendering mode of the first image 808 to the selected mode.

As is described previously, the annotation panel 810 may be displayed over top of a neighboring viewport 824 that is directly adjacent to the first viewport 806 so as to cover a portion of the neighboring viewport 824. The annotation panel 810 may be closed in various ways. For example, a close element 830 may be displayed within the annotation panel 810 that when selected removes the annotation panel 810 from display. Further, the annotation panel 810 may automatically close in response to user selection or interaction with elements (e.g., tools, icons, etc.) of the first viewport 806, any of the other of the plurality of viewports 802, and/or any tool or icon of the GUI.

In some examples, only one annotation panel may be displayed within the GUI at a single time. In this way, display of annotation panels may be updated automatically in response to user interaction with viewports and the GUI. Further, the user may more easily identify the information in annotations corresponding to an image of interest as the displayed annotation panel is linked to the viewport of interest. The annotation panel may allow annotation panels that would otherwise have degraded text because of annotation overlaps to be viewed in full, thereby improving user experience and ability to use the annotation information during evaluation and diagnosis.

Figure 9:
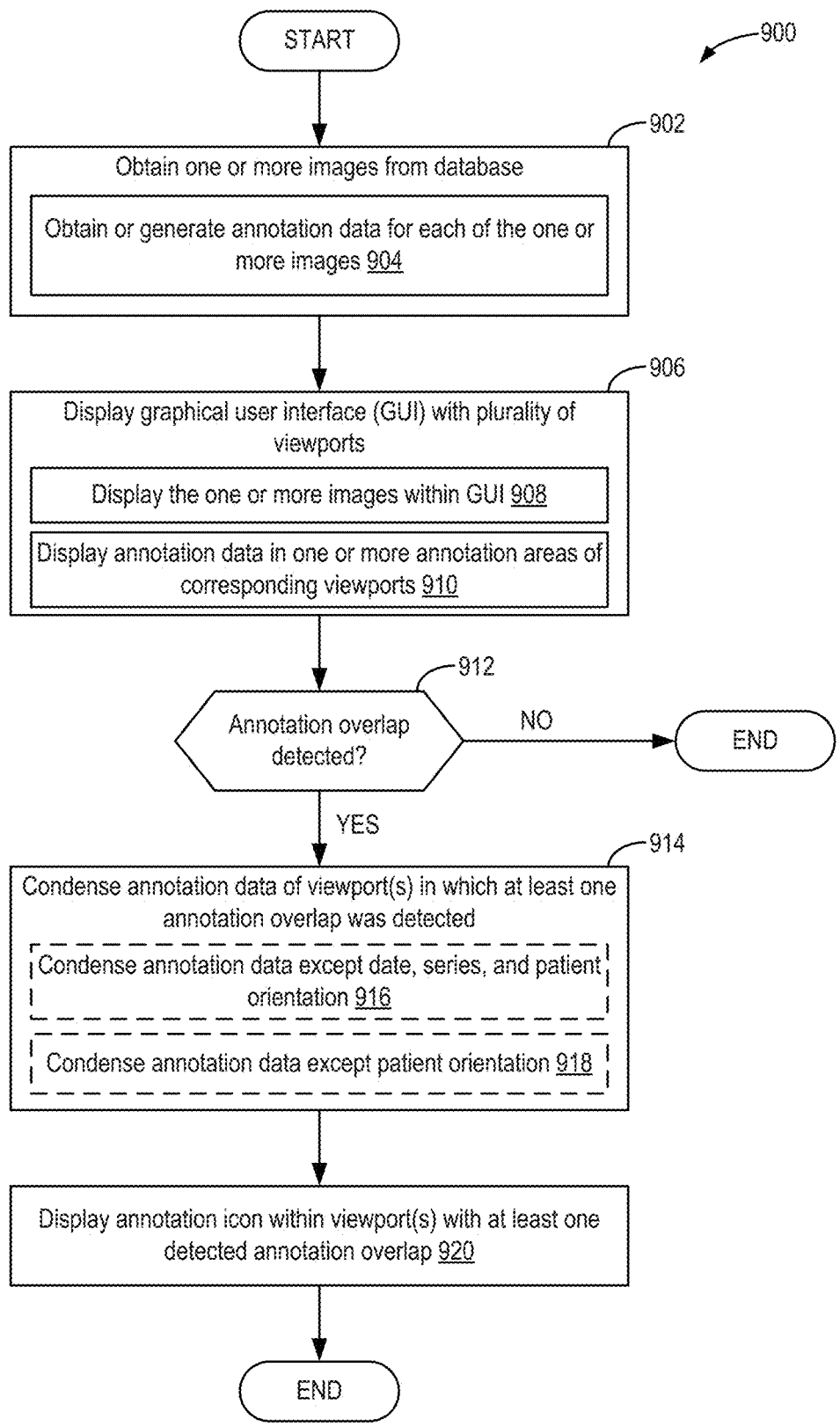
FIG. 9 shows a flowchart illustrating an example method for condensing annotation data.

Turning now to FIG. 9, a flowchart illustrating a method 900 for condensing annotation data is shown. The method 900 may be carried out using the systems and components described herein above with regard to FIG. 1. For example, the method 900 may be carried out according to instructions stored in memory of one or more processors of a computing device, such as computing device 102, which is communicatively coupled to a display device configured to display a GUI, such as second GUI 300 of FIG. 3.

At 902, method 900 includes obtaining one or more images from a database. The one or more images may be specific to a patient or a group of patients and may include image data of various types of renderings, such as MPRs and/or MIPs. In some examples, the one or more images may be stored in the database and retrieved from the database in DICOM format. Data of the one or more images may include annotation data information, including acquisition date, image series, image phase, fusion percentage, various image view types and/or rendering modes, orientation type, and patient orientation for each image view type as well as data of the scan including window width, window level, radiotracer/contrast concentration, display field of view (DFOV), and the like. The annotation data may be obtained and/or generated along with the obtained one or more images, as noted at 904.

At 906, method 900 includes displaying a GUI with a plurality of viewports within a window of the display screen. The window, in some examples, may be a browser window, an application window, or other window configured to display the GUI. The GUI may include the plurality of viewports, each viewport of the plurality of viewports configured to display one of the one or more images. In some examples, display of the one or more images within the GUI as noted at 908, may be performed at substantially the same time as display of the GUI and the plurality of viewports. In other examples, the GUI may be displayed initially without the one or more images and then at a later time the one or more images may be displayed within the plurality of viewports, for example in response to user input selecting a scan of interest.

Display of the one or more images within the GUI may also include display of the annotation data as a plurality of annotation overlays each within a respective annotation area of corresponding viewports, as noted at 910. For example, annotation data for a first image may be displayed within annotation areas of a first viewport that is displaying the first image. The annotation areas, as described with respect to FIG. 2, may have predefined dimensions, including a preset height and width (both in number of pixels), in some examples defined by the annotation displayed therein as previously described. The dimensions of each annotation area may not depend on a size of the window of the GUI and/or a corresponding viewport, though which pixels of the viewport are occupied by each of the annotation areas of the viewport (e.g., position of each of the annotation areas within the viewport) may depend on dimensions of the viewport and/or the GUI window. The position of each of the annotation areas of each of the plurality of viewports may be updated dynamically automatically in response to changes in GUI window size and/or viewport size.

At 912, method 900 includes judging whether an annotation overlap has been detected. As noted, the annotation areas of a viewport have predefined dimensions that are independent of the size of the viewport, but the position of each of the annotation areas may depend on the size of the viewport. In this way, in some instances, one or more annotation areas, and consequently the annotation overlays displayed therein, may overlap with one another. Overlapping, in this context, may describe at least two annotation areas occupying the same pixels within the viewport. Detection of an overlap may include detecting that at least two annotation areas occupy the same pixels/space in the viewport. In some examples, more than one annotation overlap may be detected within one viewport, and, in some examples, more than one viewport of the GUI may have one or more detected annotation overlaps. If at least one annotation overlap is detected within at least one viewport, method 900 proceeds to 914. If no annotation overlaps are detected within any viewport of the GUI, method 900 ends.

At 914, method 900 includes condensing annotation data of viewport(s) in which at least one annotation overlap was detected. In some examples, as noted, more than one viewport of the GUI may have at least one annotation overlap detected therein. Annotation data may be condensed for those viewports wherein at least one annotation overlap is detected but not for viewports in which no annotation overlap is detected. As described with respect to FIG. 1, condensing may include removing the annotation overlays from display within the corresponding viewport and storing the annotation data thereof in memory to be accessed via selection of an annotation icon, as will be further described.

In some examples, all annotation data may be condensed for a particular viewport except for image acquisition date, image series, and patient orientation annotation overlays, as noted at 916. The patient orientation annotations may include laterality labels (e.g., left and right) and anterior/posterior labels and may be positioned within the viewport at corresponding locations. The acquisition date and image series annotation overlays may, in some examples, be displayed in an upper left portion of the viewport.

In other examples, all annotation data may be condensed for the particular viewport except for the patient orientation annotation overlays, as noted at 918. Whether only the patient orientation annotation overlays remain displayed or whether the date, series and patient orientation annotation overlays remain displayed may depend on where the at least one annotation overlaps occur, as described with respect to FIGS. 3 and 4. For example, when an annotation overlap occurs between the image series annotation area and the patient orientation annotation area, only the patient orientation annotation overlay may remain displayed within the viewport. As another example, when an annotation overlap occurs between the patient orientation annotation area and any annotation area other than the date annotation area and/or the series annotation area, the acquisition date annotation overlay, the image series annotation overlay, and the patient orientation annotation overlays may all remain displayed within the viewport. Any combination of annotation overlaps that do not include the date annotation area and/or the series annotation area may trigger condensing of all annotation data except the date, series, and patient orientation annotation overlays. In this way, the patient orientation annotation overlays, which may demand display within the viewport for proper evaluation of the image, may always be displayed within the viewport.

At 920, method 900 includes displaying an annotation icon within viewport(s) with at least one detected annotation overlap. The annotation icon may be a selectable element that, when selected via user input such as a mouse click, modifies the GUI by launching an annotation panel, as will be further described with respect to FIG. 10. The annotation data condensed at 914 may be accessible via selection of the annotation icon and may be displayed within the annotation panel.

In this way, degradation to the text of one or more annotation overlays as a result of overlaps in annotation areas and overlays may be mitigated. Annotation overlaps may result in text of annotation overlays being cut off, not clearly visible, or otherwise altered, and therefore overlaps may degrade the annotation data when viewed by the user. Condensing annotation overlaps in viewports in which overlaps are detected, by way of removing the annotation overlays from display and storing the annotation data to be accessed via the annotation icon, may mitigate this degradation and allow the information of the annotation data to be viewed in full without degradation.

Figure 10:
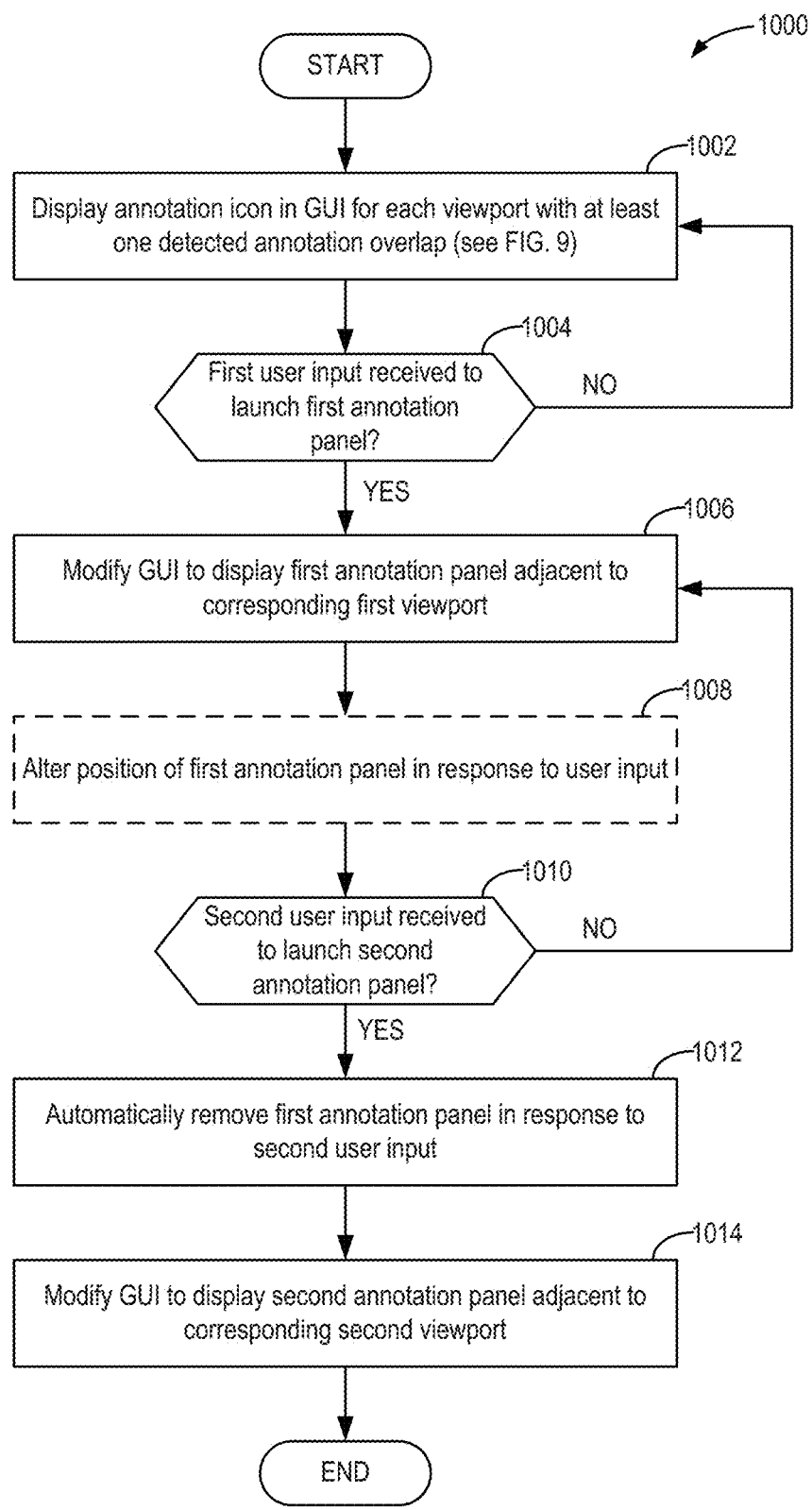
FIG. 10 shows a flowchart illustrating an example method for displaying one or more annotation panels within a GUI.

Turning now to FIG. 10, a flowchart illustrating a method 1000 for displaying one or more annotation panels within a GUI is shown. The method 1000 may be carried out using the systems and components described herein above with regard to FIG. 1. For example, the method 1000 may be carried out according to instructions stored in memory of one or more processors of a computing device, such as computing device 102, that is communicatively coupled to a display device configured to display a GUI, such as GUI 500 of FIG. 5. In some examples, the method 1000 may be performed following or otherwise in conjunction with method 900.

At 1002, method 1000 includes displaying an annotation icon for each viewport with at least one detected annotation overlap. As described with respect to FIG. 9, annotation data of obtained images may be displayed within respective viewports as annotation overlays in respective annotation areas with predefined dimensions. Depending on dimensions of the respective viewports, the annotation areas, and thus the annotation overlays, may overlap with one another such that at least two annotation areas occupy one or some of the same pixels of the viewport. Detection of at least one such annotation overlap within a viewport may automatically trigger condensation of a portion of the annotation data thereof, wherein corresponding annotation overlays are removed from the display. A respective annotation icon may be displayed within corresponding viewports, the condensed annotation data accessible from memory via the annotation icon.

At 1004, method 1000 judges whether a first user input is received to launch a first annotation panel. The first user input may be received via a user input device, such as a mouse, touchpad, touchscreen, and/or the like. For example, the first user input may be a left mouse click. The first user input may be a selection of a first annotation icon that is displayed within a first viewport. If the first user input to select the first annotation icon is received (YES at 1004), method 1000 proceeds to 1006. If the first user input is not received (NO at 1004), method 1000 returns to 1002 to continue displaying annotation icons for respective viewports of the GUI.

At 1006, method 1000 includes modifying the GUI to display a first annotation panel adjacent to the corresponding first viewport. Modifying the GUI may include launching the first annotation panel as a pop-up window. The first annotation panel may be initially displayed on a first or second side of the first viewport depending on a position of the first viewport within the GUI, as is described in detail with respect to FIGS. 6 and 7. The first annotation panel may display as annotations therein the portion of the annotation data that was condensed in response to detection of annotation overlap(s) within the first viewport. A configuration/arrangement of the annotations within the first annotation panel may depend upon a position of the first annotation panel with respect to the first viewport, as described with respect to FIG. 7. The displayed annotations of the first annotation panel may be interactive annotations that in response to user input (e.g., a right mouse click or a hover), triggers launch of another pop-up window such as a drop down menu.

At 1008, method 1000 optionally includes altering a position of the first annotation panel in response to user input. The first annotation panel may initially be displayed on the first or second side of the first viewport, as described above. The position of the first annotation panel may be changed to one or more available panel positions via user input (e.g., a drag and drop method). The one or more available panel positions may depend on the position of the first viewport within the GUI and the initial position of the first annotation panel. For example, the first viewport may be positioned bordering a top edge of the GUI and the initial position of the first annotation panel may be to the first side of the first viewport. The available panel positions in such an example may be to the second side and at a bottom edge of the first viewport. The first annotation panel may always border a side or edge of the first viewport such that the first annotation panel is visibly linked to the first viewport.

At 1010, method 1000 judges whether a second user input is received to launch a second annotation panel. The second user input may be the same type of user input as the first user input described above, for example a left mouse click. The second user input may be a selection of a second annotation icon within a second viewport that is different than the first viewport. If the second user input is received (YES at 1010), method 1000 proceeds to 1012. If the second user input is not received (NO at 1010), method 1000 returns to 1006 to continue displaying the modified GUI with the first annotation panel adjacent to the first viewport.

At 1012, method 1000 includes automatically removing the first annotation panel from the GUI in response to the second user input. In some examples, user interaction with any interactive element not within the first annotation panel may trigger the first annotation panel to close (e.g., be removed from display). For example, user interaction with a GUI tool, with an element within the first viewport, and/or with an element within any other viewport, including the second viewport, may cause the first viewport to close. Thus, user selection of the second annotation icon of the second viewport may trigger the first annotation panel to close. As is described above, only one annotation panel may be displayed within the GUI at a time and therefore user selection of the second annotation icon, indicating that a second annotation panel is to be displayed, may result in the first annotation panel that is currently displayed being removed to accommodate display of the second annotation panel.

At 1014, method 1000 includes modifying the GUI to display the second annotation panel adjacent to the corresponding second viewport. As with the first annotation panel, the second annotation panel may be displayed in a first position on either the first side or the second side of the second viewport depending on a position of the second viewport within the GUI. Similar to as described at 1008, the second annotation panel may be moved to one or more available panel positions via user input. The second annotation panel may display as annotations therein the portion of the annotation data that was condensed in response to detection of annotation overlap(s) within the second viewport. In some examples, in response to user selection of the second annotation icon, the first annotation panel may be closed and the second annotation panel may be opened at substantially the same time.

As is described above, the GUI may display one or more images each within a respective viewport of the GUI. Degradation to annotations as a result of overlapping annotation areas and annotation overlays is mitigated by condensation of respective annotation data. Method 1000 herein described may allow the user to view annotation data for a selected image in full without any overlaps or text degradation. In this way, the annotation data may be used in evaluation of the image for diagnostic, disease monitoring, or other purposes even when viewport size or GUI window size is small.

Further, processing demands of the computing device and/or computing system displaying the GUI may be reduced. As not all annotation data may be displayed at a single time when overlaps are detected and at least some of the annotation data is condensed, processing demands for displaying annotation overlays is reduced. Additionally, previewing annotations via hovering over a respective annotation icon may further reduce processing demands as a limited list of annotations as a preview may be shown in some examples and may reduce extraneous launching of annotation panels if deemed not necessary by the user.

A technical effect of the methods and systems for annotation panels in medical image display as herein described is that degradation to annotations may be mitigated. As annotation data is used by providers in evaluation of images for diagnostic, monitoring, and other purposes, overlaps, blurred text, covered text, and other degradations may result in reduced accuracy and efficiency of evaluation and/or diagnosis. Therefore, mitigating such degradation via the methods and systems herein provided may increase accuracy and efficiency of evaluation and/or diagnosis. Detection of overlap between annotation areas and thus annotation overlaps triggering condensation of the annotation data removes annotation overlaps from display. The annotation data that is condensed is stored in memory and remains accessible and displayable via an annotation icon displayed with a corresponding viewport of a GUI. Thus, the annotations may be viewed in a pop-up annotation panel in full without any overlap or other degradation, therefore increasing usability for the user in evaluation, including for diagnostic purposes, of the image displayed within the viewport. Further, as described above, processing demands of the computing system may be reduced as only select annotations may be displayed at a given time. For example, the processor (e.g., processor 104 of FIG. 1) of the computing device by which images are displayed may need only display annotations for respective images in response to user input when annotation overlaps are detected, therefore reducing the amount of annotations displayed at one time.

The disclosure also provides support for a computing device comprising a display screen, the computing device being configured to display on the display screen a plurality of viewports within a graphical user interface (GUI), each of the plurality of viewports displaying a respective medical image of a patient, and additionally being configured to display within the GUI one or more annotation icons and one or more annotation panels, the one or more annotation panels accessible directly from the one or more annotation icons and configured to display annotation data as a list of one or more annotations, wherein the each of the one or more annotation panels corresponds to a respective viewport of the GUI, and wherein the one or more annotation icons are displayed with the annotation data in an unlaunched state. In a first example of the system, each of the one or more annotation icons is selectable to launch an annotation panel corresponding to a viewport in which the annotation icon is displayed. In a second example of the system, optionally including the first example, each of the plurality of viewports is configured to display the annotation data as a plurality of annotation overlays within predefined annotation areas. In a third example of the system, optionally including one or both of the first and second examples, each of the one or more annotation icons is displayed in response to detection of one or more annotation overlaps within a corresponding viewport, wherein two or more annotation areas are overlapping when each annotation area occupies the same pixels of the respective viewport. In a fourth example of the system, optionally including one or more or each of the first through third examples, a subset of the one or more annotations displayed within an annotation panel corresponding to the respective viewport are interactive annotations that, when selected via user input, display a pop-up window. In a fifth example of the system, optionally including one or more or each of the first through fourth examples, the one or more annotation panels are displayed at one of a first side and a second side of a corresponding viewport depending on a position of the corresponding viewport within the GUI. In a sixth example of the system, optionally including one or more or each of the first through fifth examples, the subset of the one or more annotations displayed within the annotation panel depends on positions of the one or more annotation overlaps within the respective viewport.

The disclosure also provides support for a method for displaying annotation panels for viewports of a graphical user interface (GUI), comprising: obtaining one or more medical images and annotation data for each of the one or more medical images from a database, displaying the one or more medical images and corresponding annotation data as annotation overlays within respective viewports of the GUI, detecting at least one annotation overlap within a first viewport, condensing a portion of the annotation data corresponding to the first viewport in response to detection of the at least one annotation overlap, displaying an annotation icon within the first viewport, and displaying an annotation panel directly adjacent to the first viewport in response to selection of the annotation icon via user input, wherein the annotation panel displays the portion of the annotation data. In a first example of the method, each annotation overlay displayed within the first viewport is displayed within a designated annotation area that occupies a predefined number of pixels of the first viewport. In a second example of the method, optionally including the first example, the predefined number of pixels that each designated annotation area occupies is unchanged when a size of the first viewport is changed. In a third example of the method, optionally including one or both of the first and second examples, detecting at least one annotation overlap within the first viewport comprises detecting that at least two designated annotation areas occupy the same pixels of the first viewport. In a fourth example of the method, optionally including one or more or each of the first through third examples, the portion of the annotation data that is condensed depends on which annotation areas are overlapping, wherein the portion includes all annotation data except image acquisition date, image series, and patient orientation when the at least two designated annotation areas do not display annotation overlays for image acquisition date and image series and wherein the portion includes all annotation data except patient orientation when one of the at least two designated annotation areas display an annotation overlay for one of image acquisition date and image series. In a fifth example of the method, optionally including one or more or each of the first through fourth examples, the method further comprises: detecting annotation overlaps within respective viewports automatically and dynamically in response to changes in size of the first viewport. In a sixth example of the method, optionally including one or more or each of the first through fifth examples, the method further comprises: detecting at least one annotation overlap within a second viewport, condensing a second portion of the annotation data corresponding to the second viewport, and displaying a second annotation icon within the second viewport. In a seventh example of the method, optionally including one or more or each of the first through sixth examples, the method further comprises: removing the annotation panel from display in response to one of user selection of the second annotation icon, user interaction with an element in the first viewport, and user interaction with a tool of the GUI.

The disclosure also provides support for a medical imaging system, comprising: an imager configured to acquire medical imaging data of a patient, wherein the imager is coupled to a database configured to store the medical imaging data and to a computing device configured with instructions stored in non-transitory memory executable by a processor that, when executed, cause the processor to: display a graphical user interface (GUI) comprising a grid of viewports, wherein each viewport displays a medical image of the medical imaging data and a plurality of annotation overlays corresponding to the medical image, display a first annotation icon within a first viewport of the grid of viewports and remove one or more of the plurality of annotation overlays from the first viewport in response to detection of one or more annotation overlaps within the first viewport, modify the GUI to display a first annotation panel to a first side of the first viewport in response to selection of the first annotation icon, and close the first annotation panel in response to user selection of a selectable element within one of the GUI, the first viewport, and a second viewport. In a first example of the system, the first annotation panel is displayed in an initial position to the first side of the first viewport and the initial position of the first annotation panel is saved to memory. In a second example of the system, optionally including the first example, the initial position of the first annotation panel is adjustable to one or more available panel positions via user input and each of the one or more available panel positions is directly adjacent to the first viewport and depends on a position of the first viewport within the GUI. In a third example of the system, optionally including one or both of the first and second examples, the system further comprises: displaying a second annotation panel to one of the first side and a second side of the second viewport in response to user selection of a second annotation icon displayed within the second viewport. In a fourth example of the system, optionally including one or more or each of the first through third examples, the first annotation panel, when launched, displays annotation data corresponding to the one or more of the plurality of annotation overlays removed from the first viewport.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A computing device comprising a display screen, the computing device being configured to display on the display screen a plurality of viewports within a graphical user interface (GUI), each of the plurality of viewports displaying a respective medical image of a patient, and additionally being configured to display within the GUI one or more annotation icons and one or more annotation panels, the one or more annotation panels accessible directly from the one or more annotation icons and configured to display annotation data as a list of one or more annotations, wherein the each of the one or more annotation panels corresponds to a respective viewport of the GUI, wherein the one or more annotation icons are displayed with the annotation data in an unlaunched state, wherein each of the plurality of viewports is configured to display the annotation data as a plurality of annotation overlays within predefined annotation areas and, in response to detection of one or more annotation overlaps within a corresponding viewport, a portion of the annotation data is condensed and each of the one or more annotation icons is displayed, wherein the portion of the annotation data that is condensed depends on which annotation overlays are overlapping, and wherein the portion includes a first subset of the annotation data in a first condition and a second subset of the annotation data different from the first subset in a second condition different from the first condition.

2. The computing device of claim 1, wherein each of the one or more annotation icons is selectable to launch an annotation panel corresponding to a viewport in which the annotation icon is displayed.

3. The computing device of claim 1, wherein two or more annotation areas are overlapping when each annotation area occupies the same pixels of the respective viewport.

4. The computing device of claim 3, wherein a subset of the one or more annotations displayed within an annotation panel corresponding to the respective viewport are interactive annotations that, when selected via user input, display a pop-up window.

5. The computing device of claim 1, wherein the one or more annotation panels are displayed at one of a first side and a second side of a corresponding viewport depending on a position of the corresponding viewport within the GUI.

6. The computing device of claim 1, wherein the first subset of the annotation data includes all annotation data except image acquisition date, image series, and patient orientation and the first condition comprises the annotation overlays that are overlapping not displaying image acquisition date and image series, and wherein the second subset of the annotation data includes all annotation data except patient orientation and the second condition comprises the annotation overlays that are overlapping comprising an annotation overlay for one of image acquisition date and image series.

7. A method for displaying annotation panels for viewports of a graphical user interface (GUI), comprising:
obtaining one or more medical images and annotation data for each of the one or more medical images from a database;
displaying the one or more medical images and corresponding annotation data as annotation overlays within respective viewports of the GUI;
detecting at least one annotation overlap within a first viewport;
condensing a portion of the annotation data corresponding to the first viewport in response to detection of the at least one annotation overlap, wherein the portion includes a first subset of the annotation data when a first condition is met and a second subset of the annotation data when a second condition is met;
displaying an annotation icon within the first viewport; and
displaying an annotation panel directly adjacent to the first viewport in response to selection of the annotation icon via user input, wherein the annotation panel displays the portion of the annotation data.

8. The method of claim 7, wherein each annotation overlay displayed within the first viewport is displayed within a designated annotation area that occupies a predefined number of pixels of the first viewport.

9. The method of claim 8, wherein the predefined number of pixels that each designated annotation area occupies is unchanged when a size of the first viewport is changed.

10. The method of claim 8, wherein detecting at least one annotation overlap within the first viewport comprises detecting that at least two designated annotation areas occupy the same pixels of the first viewport.

11. The method of claim 10, wherein the first subset of the annotation data includes all annotation data except image acquisition date, image series, and patient orientation and the first condition is that the at least two designated annotation areas do not display annotation overlays for image acquisition date and image series, and wherein the second subset includes all annotation data except patient orientation and the second condition is that one of the at least two designated annotation areas display an annotation overlay for one of image acquisition date and image series.

12. The method of claim 7, further comprising detecting annotation overlaps within respective viewports automatically and dynamically in response to changes in size of the first viewport.

13. The method of claim 7, further comprising detecting at least one annotation overlap within a second viewport, condensing a second portion of the annotation data corresponding to the second viewport, and displaying a second annotation icon within the second viewport.

14. The method of claim 13, further comprising removing the annotation panel from display in response to one of user selection of the second annotation icon, user interaction with an element in the first viewport, and user interaction with a tool of the GUI.

15. A medical imaging system, comprising:
an imager configured to acquire medical imaging data of a patient, wherein the imager is coupled to a database configured to store the medical imaging data and to a computing device configured with instructions stored in non-transitory memory executable by a processor that, when executed, cause the processor to:
display a graphical user interface (GUI) comprising a grid of viewports, wherein each viewport displays a medical image of the medical imaging data and a plurality of annotation overlays corresponding to the medical image;
display a first annotation icon within a first viewport of the grid of viewports and remove one or more of the plurality of annotation overlays from the first viewport in response to detection of one or more annotation overlaps within the first viewport, wherein the one or more of the plurality of annotation overlays that are removed comprises a first portion of the plurality of annotation overlays when a first set of the plurality of annotation overlays is included in the one or more annotation overlaps, and wherein the one or more of the plurality of annotation overlays that are removed comprises a second portion of the plurality of annotation overlays when a second set of the plurality of annotation overlays is included in the one or more annotation overlaps;

modify the GUI to display a first annotation panel to a first side of the first viewport in response to selection of the first annotation icon; and close the first annotation panel in response to user selection of a selectable element within one of the GUI, the first viewport, and a second viewport.

16. The medical imaging system of claim 15, wherein the first annotation panel is displayed in an initial position to the first side of the first viewport and the initial position of the first annotation panel is saved to memory.

17. The medical imaging system of claim 16, wherein the initial position of the first annotation panel is adjustable to one or more available panel positions via user input and each of the one or more available panel positions is directly adjacent to the first viewport and depends on a position of the first viewport within the GUI.

18. The medical imaging system of claim 15, further comprising displaying a second annotation panel to one of the first side and a second side of the second viewport in response to user selection of a second annotation icon displayed within the second viewport.

19. The medical imaging system of claim 15, wherein the first annotation panel, when launched, displays annotation data corresponding to the one or more of the plurality of annotation overlays removed from the first viewport.

* * * * *